March 8, 1932. W. M. SCOTT 1,848,668
TIME ELEMENT DEVICE
Filed Dec. 19, 1924
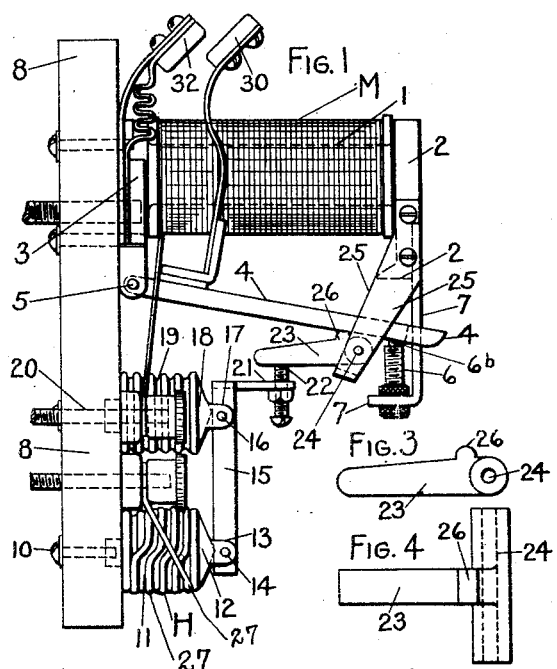
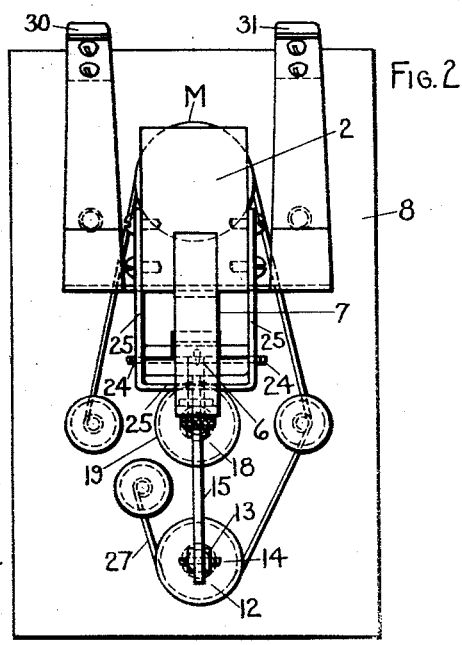
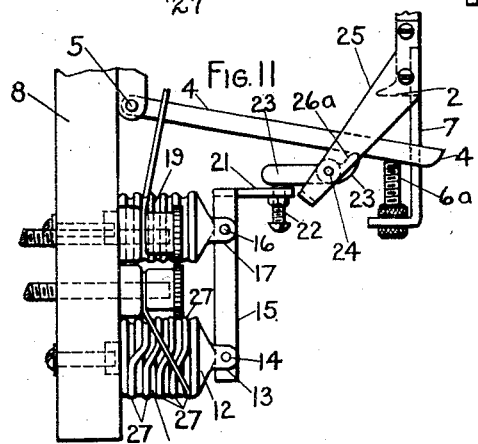
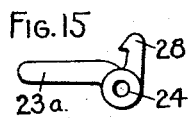
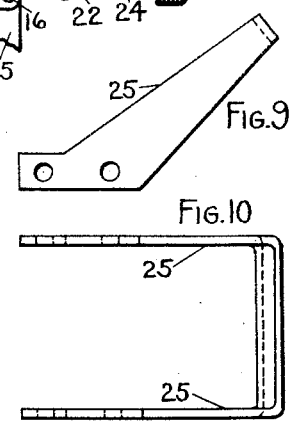
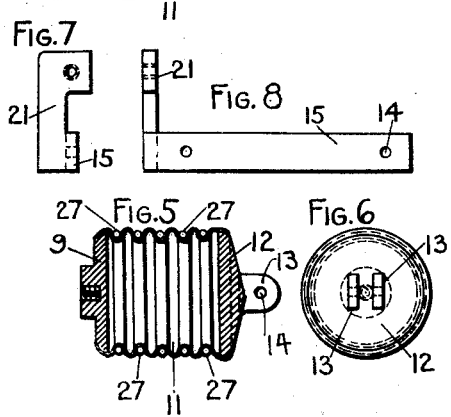
INVENTOR
William M. Scott
BY Cornelius L. Ehret
his ATTORNEY Patented Mar. 8, 1932

1,848,668

UNITED STATES PATENT OFFICE

WILLIAM M. SCOTT, OF TREDDYFRIN TOWNSHIP, CHESTER COUNTY, PENNSYLVANIA

TIME ELEMENT DEVICE

REISSUED

Application filed December 19, 1924. Serial No. 757,077.

My invention relates to time-element or start delaying devices, and particularly such as are applicable to the movable members of systems of electromagnets, solenoids and the like.

In accordance with my invention the member whose movement is to be delayed is restrained by any suitable means, electrical, magnetic or mechanical, or equivalent, and the restraint is reduced or removed after an elapse of time by thermal means.

More particularly, in accordance with my invention, thermal means responsive to heat produced by an electric current, controls or exerts a force upon the member to be moved, in such manner that after an interval of time the member to be moved is freed and thereafter moves under the influence of an applied force.

Further, in accordance with my invention, there are provided means for compensating for changes of temperature of the surrounding atmosphere.

My invention resides in apparatus of a character hereinafter described and claimed.

For an understanding of my invention and for illustration of some of the various forms it may take, reference is to be had to the accompanying drawings in which:

Fig. 1 is a side elevational view of apparatus embodying my invention.

Fig. 2 is a front elevation of the apparatus shown in Fig. 1.

Figs. 3 and 4 are, respectively, side elevational and plan views, on enlarged scale, of an element of Fig. 1.

Figs. 5 and 6 are, respectively, longitudinal sectional and end elevational views of a heat responsive member.

Figs. 7 and 8 are, respectively, end and side views of an element in Fig. 1.

Figs. 9 and 10 are, respectively, side and front views of an element of Fig. 1.

Fig. 11 is a fragmentary side elevational view of a modified structure.

Figs. 12 and 13 are, respectively, side and plan views of an element of Fig. 11.

Fig. 14 is a fragmentary side elevational view of a further modification.

Figs. 15 and 16 are, respectively, side and bottom plan views of an element of Fig. 14.

Referring to Figures 1 to 10 inclusive, M is an electromagnet or solenoid, whose core 1 is provided with the poles 2 and 3. There is represented generically by the member 4 an armature, core or other movable member of the magnet or solenoid. In the example illustrated it is an armature co-acting with the poles 2 and 3 mounted for pivotal movement at 5. When the winding of the magnet or solenoid M is traversed by electric current there is produced a magnetic field effecting magnetization of the poles 2 and 3 and of the member 4, thereby exerting upon the member 4 a force tending to move it about its pivot 5 toward the pole 2. The member 4 normally rests upon the magnetizable tip 6—*b* of the adjustable stop or screws 6 of non-magnetizable metal which is carried by the bracket 7 of non-magnetizable material. When the magnet is energized, there is exerted between the members 4 and the magnetizable tip 6—*b* an attractive force which resists the upward attraction of the member 4 toward the more distant pole 2, thereby restraining the member 4 against the eventually desired movement. The restraining force exerted upon the armature 4 by the magnetizable tip 6—*b* is due to the stray field induced by the magnet M and is dependent upon intimate contact of the armature 4 with tip 6—*b*, which force disappears when this contact is broken. To break this contact and thus free the member 4 from restraint, to permit it to move upward about its pivot 5, there is provided a thermoresponsive mechanism which, after a suitable length of time, in response to heat applied thereto, exerts upon the member 4 a force sufficient with the upwardly acting magnetic force exerted thereon by the pole 2, to free the member 4 from the member 6.

There is mounted upon the base, upon which the above described apparatus is supported, a heat responsive device H, of any suitable type. In the example illustrated it comprises the end closure member 9, Fig. 5, secured by screw 10 to the member 8, and the corrugated expansion member or chamber 11, having at its other end the closure member 12.

There is accordingly formed a sealed or pressure-tight expansible chamber in which is disposed any suitable gas or liquid which upon elevation of temperature expands, causing longitudinal expansion of the chamber 11 with consequent movement of the member 12 away from the base 8.

The member 12 is provided with ears or lugs 13 in which there is pivoted at 14 the upwardly extending lever or bar 15, pivoted at 16 in the ears or lugs 17 carried by the end closure member 18 of the second thermo-responsive device comprising the sealed expansible chamber 19 whose other closure member is secured by screw 20 to the base 8. The chamber 19 is filled with suitable gas or liquid expansible upon temperature change.

The gases or liquids in the chambers 11 and 19 may be similar or dissimilar. In either or both may be utilized carbon tetrachloride, ether, alcohol, or the like, and in general any gas or any liquid or other substance the heating of which will cause expansion of the chamber enclosing it.

The member 15 has the forwardly extending arm or lug 21 through whose end is threaded adjustable stop or screw 22 adapted to engage the under side of the member 23, pivoted at 24 in the bracket 25, of non-magnetic material secured to the magnet pole 2. At a distance from the pivot 24 the member 23 is provided with a lug or projection 26 adapted to engage the under side of the armature 4. The lug 26, or both lug 26 and member 23, are preferably of brass or other non-magnetic material.

Coiled around the chamber 11 and insulated therefrom is the conductor 27 which is connected in any suitable electric circuit whereby, due to the heating effect of the current traversing the resistance 27, the temperature of the contents of the chamber 11 is raised, causing a slow or delayed outward expansion of the chamber 11.

In the example illustrated, the resistance or conductor 27 is connected in the same circuit with the winding of the magnet or solenoid M and, as indicated, preferably in series therewith, whereby the same current which energizes the magnet M serves also to raise the temperature of the contents of the chamber 11. Accordingly the pivot 14 of the member 15 is slowly moved outwardly from the base 8, moving the lever 15 in counter-clockwise direction about its pivot 16, causing the member 22 to rotate the member 23 in clockwise direction about its pivot 24, thereby causing the lug 26 to force the armature 4 upwardly away from contact with the member 6—$b$, whereupon, due to the attraction by magnet M, the armature will rapidly move upwardly to the pole face 2.

By the operation described the start of the member 4, after energization of the magnet M, or after a substantial change in the magnitude of the current traversing the winding of the magnet M, is delayed for a period corresponding with the time required to effect sufficient expansion of the chamber 11.

Inasmuch as the temperature of the atmosphere surrounding the apparatus varies, the chamber 19 will expand with rise in temperature of the atmosphere, moving the pivot 16 outwardly from the base 8, and similarly rise in temperature of the atmosphere causes pivot 14 to move outwardly from the base 8 to a substantially similar extent, with the result that the lever 21 has no angular movement about pivot 16; thus the position of lever 23 remains unaffected and armature 4 is therefore not released from restraint except when the temperature of the contents of chamber 11 materially exceeds the temperature of the atmosphere, thereby causing counter-clockwise movement of lever 15 with resultant clockwise movement of lever 23 about its pivot 24, and consequent movement of the armature 4 out of engagement with the magnetic tip 6—$b$. The chamber 19 in effect compensates for or renders the mechanism indifferent to changes of temperature of the atmosphere.

In Fig. 11 the arrangement is in general the same, with the exception that the stop or member 6$a$ is of brass or other non-magnetic material throughout, while the member 23 is of iron or other magnetizable material, in this case having the lug 26$a$ disposed upon the opposite side of the pivot 24, and magnetically attracting and restraining the armature 4 which is magnetized when the winding of the magnet M is energized.

In this case the outward movement of the pivot 14 again rotates the member 23 in clockwise direction forcibly withdrawing it from armature 4, whereupon the latter is free to the attraction exerted by the pole 2.

In Fig. 14 the arrangement is again, in general, the same. The stop 6$a$ is again of non-magnetic material. Pivoted at 24 to the bracket 25 is the latch or detent 28 whose tail 23$a$ is actuated by the member 22 to free the detent from the latch plate or detent plate 29 secured to the armature 4. Either or both of the members 28 and 29 is or are of non-magnetic material.

In this case the restraint upon the member 4 is mechanical, and is removed by actuation of the detent 28 by the chamber 11 after elapse of suitable length of time.

In all the arrangements described the restraint upon the member whose start is to be delayed, as armature 4, is overcome by very small movement of the thermo-actuated means, as 23 or 23a.

Movement of the member or armature 4 may be utilized for any suitable purpose as, for example, actuating the latch or other restraining means of an electric switch, such for example as an automatic magentic circuit breaker of which the magnet M may be the over-load magnet, or one responsive to rise in line voltage, or to any other desired electrical condition.

In the example illustrated, however, the member 4 is the armature of the electro-magnetic relay controlling or actuating the movable contacts 30 and 31, electrically connected to each other and carried by the armature 4, and adapted to engage and bridge co-acting stationary relay contacts 32 included in any circuit to be controlled, as for example in the circuit of the electromagnet utilized to control the restraining means or latch of an electric switch or circuit breaker.

What I claim is:

1. The combination with a movable member comprising a magnetizable element, of current-controlled means for exerting a force thereon to move it, means for restraining said member, heat responsive means for transmitting force to free said member from said restraining means, and heat responsive means compensating for the effect of changes of temperature of atmosphere upon said first named heat responsive means.

2. The combination with a magnet winding, of a movable magnetizable member co-acting therewith, means dependent upon the effect of said winding for restraining said member against movement, heat responsive means for freeing said movable member from said restraining means, and electrical means for applying heat to said heat responsive means.

3. The combination with a magnet winding, of a movable magnetizable member co-acting therewith, means for restraining said member against movement, heat responsive means for freeing said movable member from said restraining means, electrical means for applying heat to said heat responsive means, and heat responsive means for compensating for the effect upon said first named heat responsive means of changes of temperature of the atmosphere.

4. The combination with a magnet winding, of a movable magnetizable member co-acting therewith, means for restraining said movable member comprising a relatively stationary member between which and said movable member there is effected magnetic attraction, and heat responsive means for separating said members from each other.

5. The combination with a magnet winding, of a movable magnetizable member co-acting therewith, means for restraining said member against movement, and heat responsive means for freeing said member from said restraining means comprising an expansible chamber, a member actuated in response to expansion of said chamber, and a member actuated by said last named member for freeing said movable magnetizable member.

6. The combination with a magnet winding, of a movable magnetizable member co-acting therewith, means for restraining said member against movement, and heat responsive means for freeing said member from said restraining means comprising an expansible chamber, a member actuated in response to expansion of said chamber, a member actuated by said last named member for freeing said movable magnetizable member, and electrical means for applying heat to said chamber.

7. The combination with a magnet winding, of a movable magnetizable member co-acting therewith, means for restraining said member against movement, and heat responsive means for freeing said member from said restraining means comprising an expansible chamber, a member actuated in response to expansion of said chamber, a member actuated by said last named member for freeing said movable magnetizable member, and electrical means energized concurrently with said winding for applying heat to said chamber.

8. The combination with a magnet winding, of a movable magnetizable member co-acting therewith, means for restraining said member against movement, and means for freeing said member from said restraining means comprising a plurality of expansible chambers, a member pivoted to a movable wall of each of said chambers for freeing said movable magnetizable member, said chambers subjected to changes of temperature of the atmosphere, and electrical means energized concurrently with said winding for applying heat to one of said chambers.

9. The combination with a magnet winding, of a movable magnetizable member co-acting therewith, and means for delaying start of said movable member comprising a plurality of expansible chambers, a member pivoted to movable walls of said chambers, a third member actuated by said second named member for actuating said movable magnetizable member to start it, said chambers subjected to varying temperatures of the atmosphere, and electrical means energized concurrently with said winding for applying heat to one of said chambers.

10. The combination with a magnet winding, of a movable magnetizable member co-acting therewith, means for restraining said member against movement, and means for delaying start of said movable member comprising a plurality of members movable in response to change of a temperature, a member whose position depends upon the relative positions of said temperature responsive members for freeing said movable member to start it, and electrical means energized concurrently with said winding for applying additional heat to one of said temperature responsive members.

In testimony whereof, I have hereunto affixed my signature this 18th day of December, 1924.

WILLIAM M. SCOTT.